(12) United States Patent
Lin et al.

(10) Patent No.: US 9,130,475 B2
(45) Date of Patent: Sep. 8, 2015

(54) SWITCHED-MODE POWER SUPPLY CAPABLE OF CATCHING RADIATED ELECTROMAGNETIC INTERFERENCE AND USING ITS ENERGY

(71) Applicant: Top Victory Investments Ltd., Kowloon (HK)

(72) Inventors: Li-Wei Lin, New Taipei (TW); Chen-Chiang Lee, New Taipei (TW)

(73) Assignee: Top Victory Investment Ltd., Kowloon (HK)

( * ) Notice: Subject to any disclaimer, the term of this patent is extended or adjusted under 35 U.S.C. 154(b) by 85 days.

(21) Appl. No.: 14/080,849

(22) Filed: Nov. 15, 2013

(65) Prior Publication Data

US 2015/0138058 A1    May 21, 2015

(51) Int. Cl.
*G09G 3/36* (2006.01)
*G09G 5/00* (2006.01)
*H02M 1/44* (2007.01)
*H02M 3/335* (2006.01)

(52) U.S. Cl.
CPC .............. *H02M 1/44* (2013.01); *G09G 3/3696* (2013.01); *H02M 3/33507* (2013.01)

(58) Field of Classification Search
CPC .............. G09G 2330/02–2330/12; G09G 3/36–3/3696; H02M 1/44; H02M 3/33507

USPC .................... 345/87–104, 211–213
See application file for complete search history.

(56) References Cited

U.S. PATENT DOCUMENTS

| | | | |
|---|---|---|---|
| 7,177,166 B1 * | 2/2007 | Kris | 363/41 |
| 2001/0015900 A1 * | 8/2001 | Preller | 363/16 |
| 2005/0012702 A1 * | 1/2005 | Kim | 345/98 |
| 2005/0093794 A1 * | 5/2005 | Lee et al. | 345/87 |
| 2008/0030142 A1 * | 2/2008 | Jinno et al. | 315/169.4 |
| 2008/0074326 A1 * | 3/2008 | Huang et al. | 343/700 MS |

* cited by examiner

*Primary Examiner* — Stephen Sherman
(74) *Attorney, Agent, or Firm* — Alan D. Kamrath; Kamrath IP Lawfirm, P.A.

(57) ABSTRACT

A switched-mode power supply (SMPS), capable of catching radiated electromagnetic interference (EMI) and using its energy, includes a specific component, an antenna, a rectifier, and an energy storage capacitor or a rechargeable battery. The specific component generates radiated EMI. The antenna is disposed on or embedded in the specific component, and the frequency range of the antenna corresponds to the frequency band of the radiated EMI generated by the specific component. The rectifier is electrically connected with a terminal of the antenna. The energy storage capacitor or the rechargeable battery is electrically connected with the rectifier. The SMPS may simplify the design of circuits for suppressing radiated EMI to reduce cost, and to achieve the purpose of power saving by recycling and reuse of dissipated energy.

6 Claims, 6 Drawing Sheets

(a)

(b)

SWITCHED-MODE POWER SUPPLY CAPABLE OF CATCHING RADIATED ELECTROMAGNETIC INTERFERENCE AND USING ITS ENERGY

BACKGROUND OF THE INVENTION

1. Field of the Invention

The invention relates to a switched-mode power supply (SMPS). More particularly, the invention relates to a SMPS capable of suppressing electromagnetic interference (EMI).

2. Description of the Related Art

FIG. 1 shows a schematic diagram of a conventional SMPS using X and Y capacitors to suppress EMI. The SMPS includes a bridge rectifier, a power converter, and energy storage capacitors C1 and C2, and the power converter includes power switch components (not shown). In the SMPS, energy to be converted in each unit of time is divided into several portions by fast switching of the power switch components, and each portion of energy is converted and then transferred to the output side. When the output becomes too high or too low, the SMPS only needs to adjust the amount of the effective power in each portion.

As the switching frequency of the power switch components becomes higher, the quantity of the divided portions in each unit of time becomes larger, and the power borne in each divided portion becomes less accordingly, so that the energy borne by components in the power converter becomes less. Therefore, the components in the power converter may use a lower-level specification. In addition, a magnetic component in the power converter, such as a transformer or an inductor, induces higher voltage as the magnetic field changes faster, so that the magnetic component which operates in a higher frequency may use shorter wires to induce the required voltage and therefore may reduce the size.

Currently, high-frequency switching is a necessary manner for SMPSs. However, some loss will occur in each operation of dividing energy and will be expressed in the form of heat and noise. Low-frequency noise is conducted by wires to a live wire L and a neutral wire N of a power source on the input side of the SMPS and therefore is called conducted EMI. High-frequency noise is transmitted by radiation to space and therefore is called radiated EMI. To suppress the conducted EMI and the radiated EMI, a conventional manner is using X capacitors Cx1 and Cx2 and common-mode choke coils L1 and L2 to filter out the conducted EMI, and using Y capacitors Cy1 to Cy7 to conduct the high-frequency noise to ground to reduce the radiated EMI. The above-mentioned ground generally refers to a ground wire G of the power source on the input side of the SMPS, or a large-area metal part of an electronic product using the SMPS, such as a metal cover or a metal back bezel.

The arrangement of Y capacitors is determined according to the structure of the SMPS, because different structures generate different frequency-band noises. Moreover, the capacitances of the Y capacitors are determined according to the intensities of the noises to conduct the respective frequency-band noises to ground to reduce the radiated EMI. The Y capacitors conduct the respective noises to ground and therefore generate respective leakage currents flowing to ground. To avoid a risk of an electric shock when a user uses an electronic product, a country defines a specification about a total amount of the leakage currents of the electronic product and therefore limits a total amount of the capacitances of the Y capacitors of the SMPS used for the electronic product. However, different countries usually define different specifications about the total amount of the leakage currents, resulting in different limitations of the total amount of the capacitances of the Y capacitors. If the electronic product is sold to different countries, it needs to use the strictest specification about the total amount of the leakage currents to design the Y capacitors and results in increased design difficulty.

FIG. 2 shows schematic diagrams of (a) a snubber circuit and (b) another snubber circuit used to suppress EMI in a conventional SMPS. For the suppression of high-frequency noise, it may be implemented not only by using Y capacitors to conduct the high-frequency noise to ground, but also by electrically connecting a snubber circuit including passive components with a component generating the high-frequency noise to transform the high-frequency energy generated by the component to heat dissipated to space to reduce the radiated EMI. For example, as shown in FIG. 2 (a), a snubber circuit including a resistor R1 and a capacitor C3 is electrically connected in parallel with a power switch component, a diode D1, of the power converter of the SMPS.

As shown in FIG. 2 (b), another snubber circuit including a capacitor C4 is electrically connected in parallel with a power switch component, a power transistor Q1, of the power converter of the SMPS. However, the capacitor C4 needs to use a high-voltage resistant capacitor due to the power transistor Q1, therefore, increasing cost. Moreover, the snubber circuit needs to use a high-capacitance capacitor to limit the rate of change of voltage and current of the power switch component to achieve a better suppressive effect. However, the slow rate of change of voltage and current results that the power switch component has a rapid rise in temperature, so that the power switch component needs to use a high-temperature resistant power switch component or so that an increased size heat sink needs to be connected with the power switch component, therefore, increasing cost.

SUMMARY OF THE INVENTION

The invention is adapted to providing a SMPS capable of catching radiated EMI and using its energy, which may simplify the design of circuits for suppressing radiated EMI to reduce cost, achieving the purpose of power saving by recycling and reuse of dissipated energy.

According to an aspect of the invention, there is provided a SMPS capable of catching radiated EMI and using its energy, including a specific component, an antenna, a rectifier, and an energy storage capacitor or a rechargeable battery. The specific component generates radiated EMI. The antenna is disposed on or embedded in the specific component, in which the frequency range of the antenna corresponds to the frequency band of the radiated EMI generated by the specific component. The rectifier is electrically connected with a terminal of the antenna. The energy storage capacitor or the rechargeable battery is electrically connected with the rectifier.

According to another aspect of the invention, the specific component includes a transformer, a power switch component, or a heat sink. The power switch component includes a diode, a transistor, or a thyristor.

According to another aspect of the invention, the antenna includes a miniaturized planar antenna which is formed in a rampart-line manner.

According to another aspect of the invention, the SMPS further includes a power converter and a control chip for the power converter. A power supply terminal of the control chip is electrically connected with a first terminal of the energy storage capacitor. A second terminal of the energy storage capacitor is electrically connected to ground. The first terminal and the second terminal of the energy storage capacitor are electrically connected with an auxiliary power supply circuit. The rectifier is electrically connected with an anode terminal of a first diode. A cathode terminal of the first diode is electrically connected with the first terminal of the energy storage capacitor.

According to another aspect of the invention, the auxiliary power supply circuit includes an auxiliary winding and a second diode, and the auxiliary winding is disposed on a primary side of a transformer. A first terminal of the auxiliary winding is electrically connected with an anode of the second diode. A cathode terminal of the second diode is electrically connected with the first terminal of the energy storage capacitor. A second terminal of the auxiliary winding is electrically connected to ground.

According to another aspect of the invention, the SMPS is adapted for a liquid-crystal display (LCD) monitor or an LCD television (TV). The antenna is disposed on or embedded in a plastic cover of the LCD monitor or the LCD TV.

With at least one antenna disposed on or embedded in at least one specific component (e.g., a transformer, a power switch component, or a hear sink connected with the power switch component) generating radiated EMI in a SMPS, or with at least one antenna disposed on or embedded in a plastic cover of an electronic product (e.g., an LCD monitor or an LCD TV) using the SMPS, the SMPS may catch the radiated EMI generated by the specific component from space and then transform it into energy to store in an energy storage capacitor or a rechargeable battery. The recycled energy may be reused by the SMPS or the electronic product using the SMPS. For example, the recycled energy may be used as an auxiliary power to a control chip of the SMPS, as a standby power, or as an emergency power. Therefore, the invention may simplify the design of circuits for suppressing radiated EMI to reduce cost, and to achieve the purpose of power saving by recycling and reuse of dissipated energy.

BRIEF DESCRIPTION OF THE DRAWINGS

The invention will be described in further detail below under reference to the accompanying drawings, in which.

DETAILED DESCRIPTION OF THE INVENTION

Figure 1:
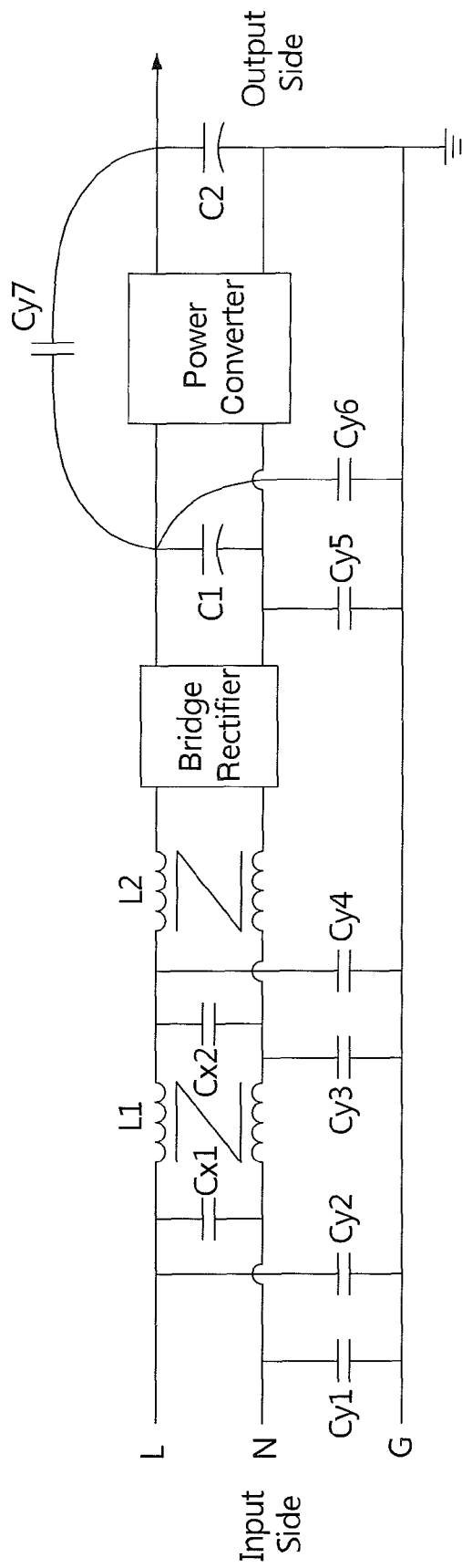
FIG. 1 shows a schematic diagram of a conventional SMPS using X and Y capacitors to suppress EMI.
Figure 2:
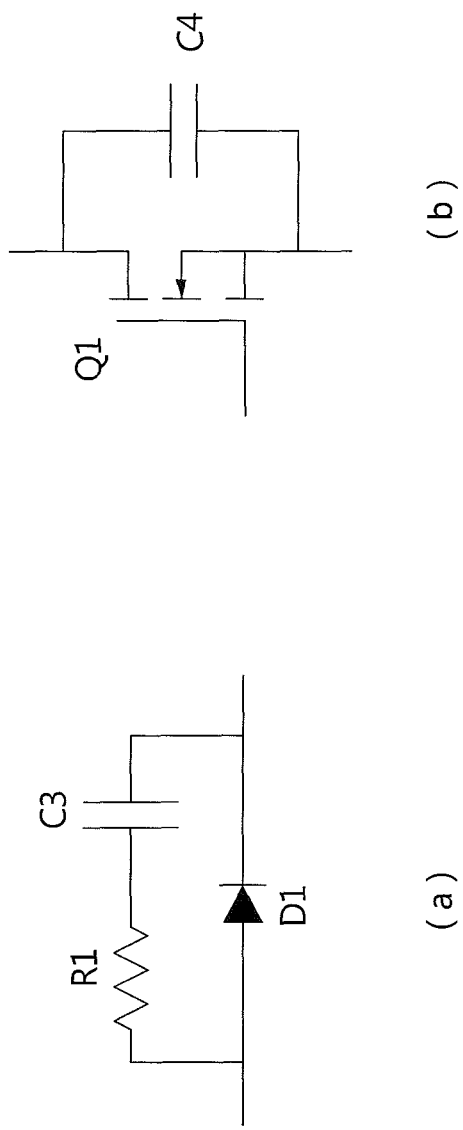
FIG. 2 shows schematic diagrams of (a) a snubber circuit and (b) another snubber circuit used to suppress EMI in a conventional SMPS.

Reference will now be made in detail to several embodiments of the invention that are illustrated in the accompanying drawings. Wherever possible, same or similar reference numbers are used in the drawings and the description to refer to the same or like parts or steps. The drawings are in simplified form and are not to precise scale or shape. For purposes of convenience and clarity only, directional terms, such as top, bottom, left, right, front, rear, up, down, over, above, and below are used with respect to the drawings. These and similar directional terms should not be construed to limit the scope of the invention in any manner.

Figure 3:
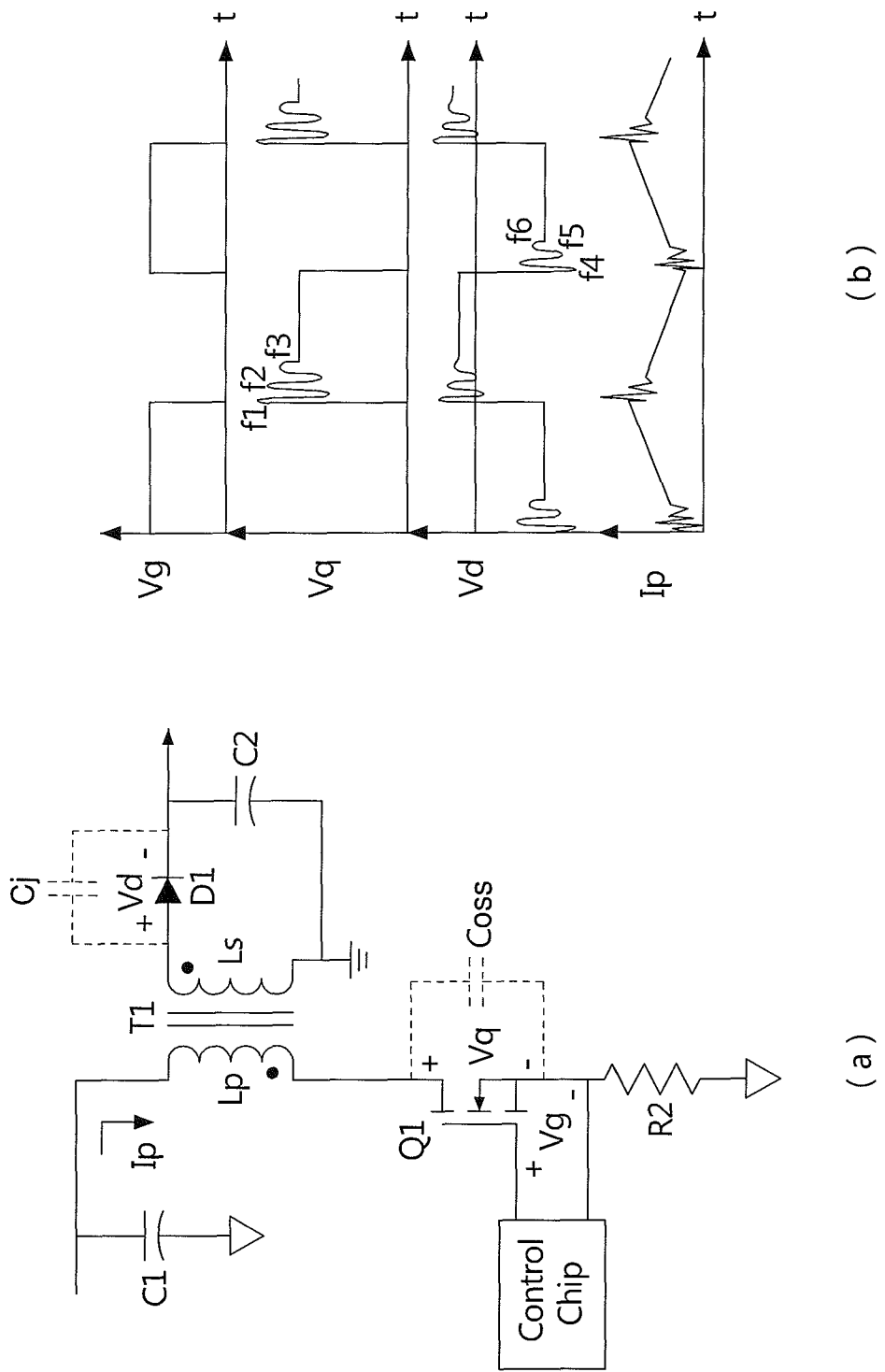
FIG. 3 shows (a) a schematic diagram of a power converter of a SMPS according to a preferred embodiment of the invention, and (b) waveform diagrams at specific components of the power converter.

FIG. 3 shows (a) a schematic diagram of a power converter of a SMPS according to a preferred embodiment of the invention, and (b) waveform diagrams at specific components of the power converter. The SMPS may use the structure as shown in FIG. 1, but not limit the invention. For example, the structure may further include a power factor corrector (PFC) or another power converter for providing a standby power. As shown in FIG. 3 (a), in the embodiment, the power converter of the SMPS uses a flyback converter including a specific component which generates radiated EMI. The specific component includes a transformer T1 and two power switch components, a power transistor Q1 and a diode D1, and the transformer T1 includes a primary winding Lp on its primary side and a secondary winding Ls on its secondary side. In addition, the power converter further includes a control chip and a resistor R2. The resistor R2 is used to detect and transfer the amount of a current Ip to the control chip, so that the control chip may provide over-current protection (OCP) according to the amount of the current Ip.

As shown in FIGS. 3 (a) and (b), when an output voltage Vg of the control chip is at a high level, the power transistor Q1 is turned on, and the diode D1 is turned off. Thus, an input voltage source stabilized by the energy storage capacitor C1 charges the primary winding Lp (resulting that the current Ip increases) as well as a leakage inductance (not shown, hereinafter called primary leakage inductance) on the primary side of the transformer T1, and the energy storage capacitor C2 discharges to supply power to load on the output side. When an output voltage Vg of the control chip is at a low level, the power transistor Q1 is turned off, and the diode D1 is turned on. Thus, the primary winding Lp discharges (resulting that the current Ip decreases) and transfers the stored energy to the secondary winding Ls to provide load current on the output side and charge the energy storage capacitor C2 as well as leakage inductance (not shown, hereinafter called secondary leakage inductance) on the secondary side of the transformer T1.

When the power transistor Q1 changes from turn-on to turn-off conditions, a resonance occurs in the primary leakage inductance and a parasitic capacitance Coss of the power transistor Q1 until the energy stored in the primary leakage inductance during the turn-on condition of the power transistor Q1 is exhausted. The resonance generates high-frequency noises whose frequencies are f1, f2, and f3 as shown in the waveform of a voltage Vq, therefore transmitting the radiated EMI to space. When the diode D1 changes from turn-on to turn-off conditions, a resonance occurs in the secondary leakage inductance and a parasitic capacitance Cj of the diode D1 until the energy stored in the secondary leakage inductance during the turn-on condition of the diode D1 is exhausted. The resonance generates high-frequency noises whose frequencies are f4, f5, and f6 as shown in the waveform of a voltage Vd, therefore transmitting the radiated EMI to space.

In the design of the SMPS, the switching frequency of the power transistor Q1 is determined once the control chip is selected, and the primary and secondary leakage inductances may be measured once the winding process of the transformer T1 is finished. Thus, by using the power transistor Q1 and the diode D1 whose parasitic capacitances Coss and Cj are given in the specification sheet, the frequency bands of the radiated EMI generated by the SMPS may be easily calculated. Preferably, another manner is using a spectrum analyzer cooperating with a near-field antenna probe capable of closing to a device under test (DUT), or using an oscilloscope cooperating with a wideband probe capable of hooking at pins or wires of a DUT, to directly measure sources of the radiated EMI and frequency bands thereof in the physical circuit of the SMPS and, especially, to directly measure the specific components. Then, antennas, whose frequency ranges correspond to the frequency bands of the radiated EMI, are disposed on or embedded in the sources of the radiated EMI, the specific components such as the transformer T1. Once the SMPS works and generates the radiated EMI, each antenna catches the radiated EMI whose frequency band corresponds thereto from space, and, then, the caught, radiated EMI is transformed to energy to reuse. Because the energy of the radiated EMI in unit of space is absorbed by the nearer antenna and results in reduced amount of the energy of the radiated EMI, the design of circuits for suppressing the radiated EMI may be greatly simplified, therefore reducing cost.

Figure 4:
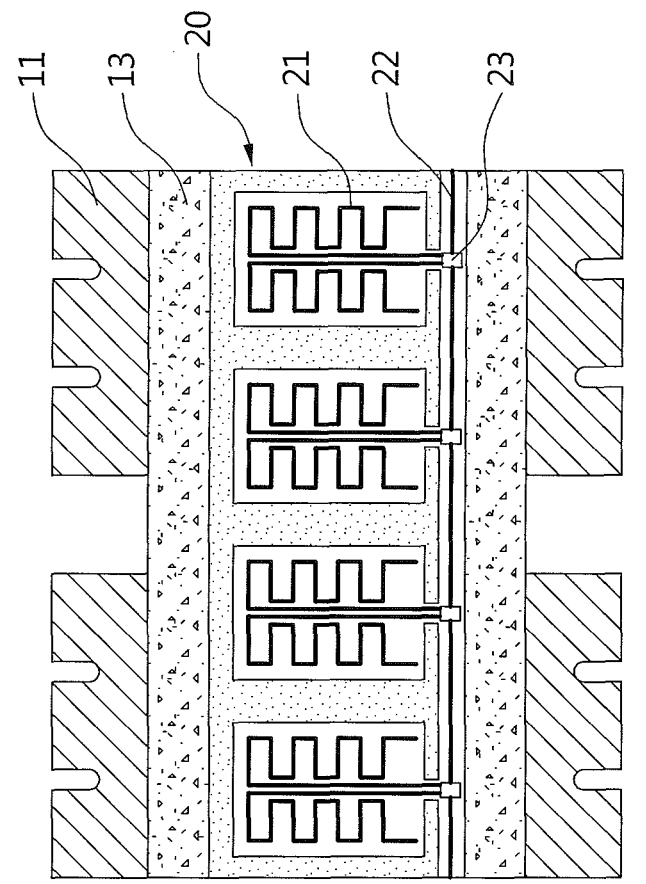
FIG. 4 shows (a) a side view and (b) a top view of a transformer of a SMPS according to a preferred embodiment of the invention.
Figure 4:
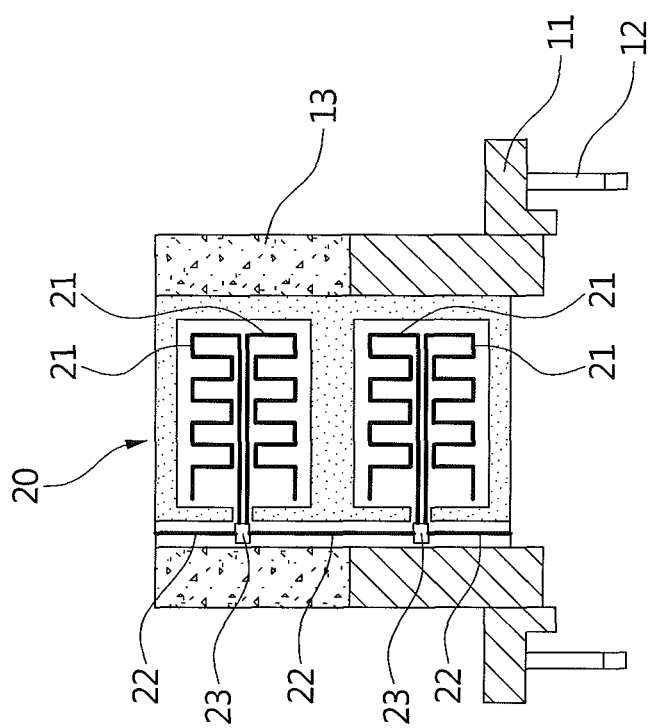

FIG. 4 shows (a) a side view and (b) a top view of a transformer of a SMPS according to a preferred embodiment of the invention. Taking the transformer T1 as shown in FIG. 3 as an example, the transformer T1 generally includes a bobbin 11, and the primary winding Lp and the secondary winding Ls wind around the bobbin 11. The bobbin 11 includes pins 12 on two sides thereof. Terminals of the primary winding Lp and the secondary winding Ls are soldered to upper terminals of corresponding pins 12, respectively, and lower terminals of the corresponding pins 12 are soldered or punched to fasten to a printed circuit board (PCB) (not shown). An insulating cover 13 is disposed on the bobbin 11 to cover and protect the primary winding Lp and the secondary winding Ls wound around the bobbin 11.

In the embodiment, first, according to the calculated or measured frequency bands of the radiated EMI of the transformer T1, antennas 21 capable of catching the frequency bands of the radiated EMI and wires 22 are printed on a surface of a substrate 20, and rectifiers 23 are disposed on the substrate 20 by using surface mount technology (SMT). A terminal of each antenna 21 is electrically connected with a corresponding rectifier 23, and the rectifiers 23 are electrically connected together by the wires 22. Next, adhesive is spread on another surface of the substrate 20. When the substrate 20 is stuck on the insulating cover 13 of the transformer T1, the antennas 21, the wires 22, and the rectifiers 23 disposed on the substrate 20 are disposed on the insulating cover 13 accordingly. In another embodiment, according to the calculated or measured frequency bands of the radiated EMI of the transformer T1, antennas 21, capable of catching the frequency bands of the radiated EMI, wires 22, and rectifiers 23 are directly embedded in the insulating cover 13 of the transformer T1.

Furthermore, in the embodiment, each antenna 21 uses a miniaturized planar antenna which is formed in a rampart-line manner, and the length of the antenna 21 corresponds to the frequency band which the antenna 21 may receive. Although the antennas 21 as shown in FIG. 4 are all in a form which is a rampart-line, with the miniaturized planar antenna having all the same length, it does not limit the invention. For example, the antennas 21 may use another form (or forms) and another length (or lengths), in which different forms result in different receiving efficiencies.

Figure 5:
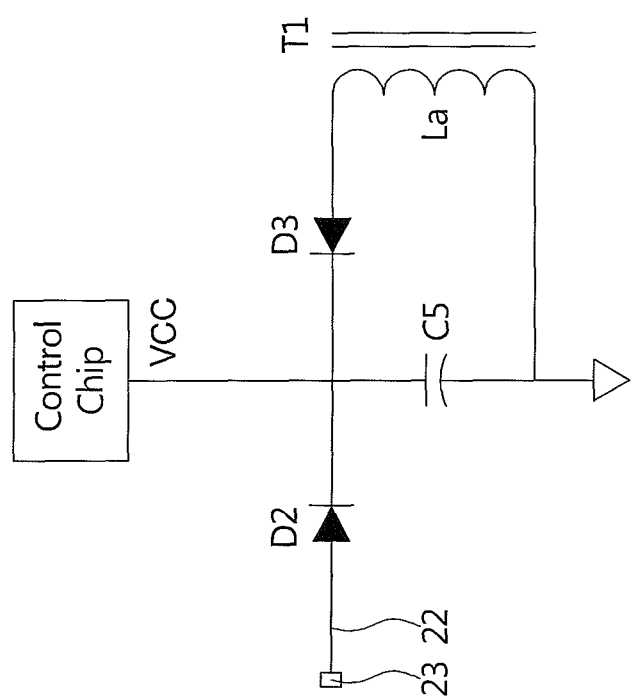
FIG. 5 shows a schematic diagram of a power supply circuit for a control chip of a power converter of a SMPS according to a preferred embodiment of the invention.

FIG. 5 shows a schematic diagram of a power supply circuit for a control chip of a power converter of a SMPS according to a preferred embodiment of the invention. Taking the power converter as shown in FIG. 3 as an example, the transformer T1 includes not only the primary winding Lp but also an auxiliary winding La on the primary side. The structure of the transformer T1 uses, for example, the structure as shown in FIG. 4, illustrating that the substrate 20 on which the antennas 21, the wires 22 and the rectifiers 23 are disposed is stuck on the insulating cover 13. The control chip of the power converter is supplied power by an auxiliary power supply circuit cooperating with an energy storage capacitor C5. A power supply terminal VCC of the control chip is electrically connected with a first terminal of the energy storage capacitor C5, and a second terminal of the energy storage capacitor C5 is electrically connected to ground. The first terminal and the second terminal of the energy storage capacitor C5 are electrically connected with the auxiliary power supply circuit.

The auxiliary power supply circuit includes an auxiliary winding La, on the primary side of the transformer T1, and a second diode D3. A first terminal of the auxiliary winding La is electrically connected with an anode terminal of the second diode D3. A cathode terminal of the second diode D3 is electrically connected with the first terminal of the energy storage capacitor C5 and therefore is electrically connected with the power supply terminal VCC of the control chip. A second terminal of the auxiliary winding La is electrically connected to ground. Thus, the first terminal and the second terminal of the energy storage capacitor C5 are electrically connected with the cathode terminal of the second diode D3 and the second terminal of the auxiliary winding La respectively. A voltage induced across the auxiliary winding La is input to the second diode D3 to rectify and then generate a direct-current (DC) voltage to store in the energy storage capacitor C5 to supply power to the power supply terminal VCC of the control chip.

In the invention, the rectifier 23 disposed on the insulating cover 13 of the transformer T1 is, via the wires 22, electrically connected with the anode terminal of the first diode D2. The cathode terminal of the first diode D2 is electrically connected with the first terminal of the energy storage capacitor C5 and therefore is electrically connected with the power supply terminal VCC of the control chip and the cathode terminal of the second diode D3. The antenna 21 disposed on the insulating cover 13 of the transformer T1 catches the radiated EMI and transforms the caught radiated EMI to a time-variant electric signal. Then, the rectifier 23 rectifies the time-variant electric signal to a DC electric signal to store in the energy storage capacitor C5 to supply power to the power supply terminal VCC of the control chip to achieve the purpose of power saving by recycling and reuse of dissipated energy.

In the above-mentioned embodiment, the power converter of the SMPS uses the flyback converter, and the power switch components of the flyback converter include the power transistor Q1 and the diode D1, but do not limit the invention. For example, the power converter may further use a boost converter, a buck converter, a full-bridge converter, a half-bridge converter, or other power converter, and the power switch component may further include a thyristor or other power switch component. Moreover, in the above-mentioned embodiment, the specific components include the transformer T1 and the power switch components (including the power transistor Q1 and the diode D1, but do not limit the invention. For example, any component which may generate radiated EMI may be used as a specific component. Thus, the specific components may further include a heat sink, because the large-area metal sheet of the heat sink has an antenna effect to generate radiated EMI. Taking cost, efficiency and so forth into consideration, the antennas are usually disposed on or embedded in the specific component whose radiated EMI has higher energy.

Figure 6:
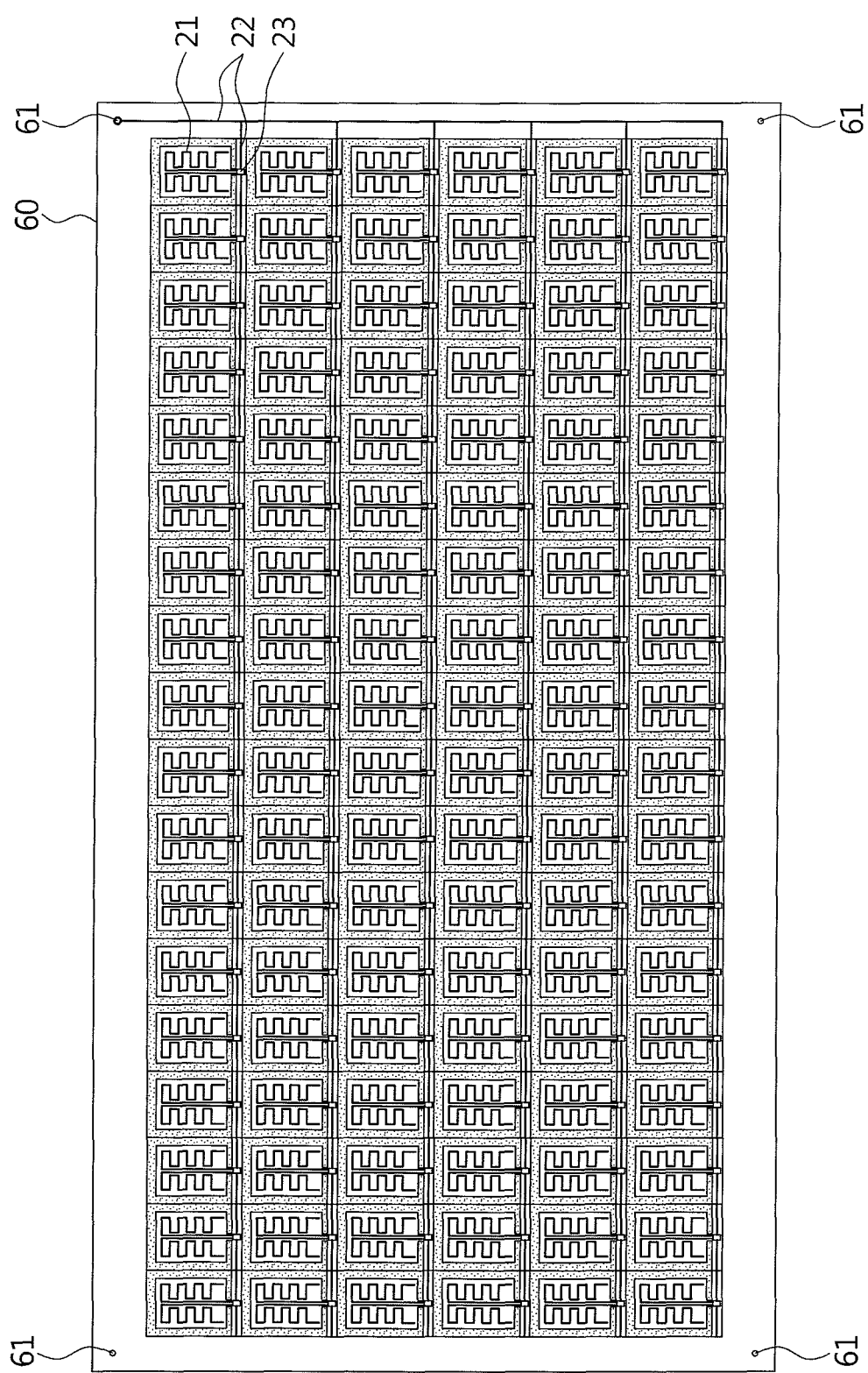
FIG. 6 shows a front view of a plastic cover of an electronic product such as LCD monitor or LCD TV according to a preferred embodiment of the invention.

The above-mentioned SMPS may be adapted for an LCD monitor, an LCD TV, or other electronic product. FIG. 6 shows a front view of a plastic cover of an electronic product such as LCD monitor or LCD TV according to a preferred embodiment of the invention. In the embodiment, the antennas 21, the wires 22, and the rectifiers 23 may be disposed on or embedded in the plastic cover 60 of the electronic product using the SMPS. The rectifiers 23 are, via the wires 22, electrically connected with ring wires which surround assemble holes 61 of the plastic cover 60, respectively. When the plastic cover 60 is fastened to the electronic product by inserting metal fixing pieces such as screws into the assemble holes 61, respectively, the rectifiers 23 are, via the wires 22 and the metal fixing pieces, electrically connected with an energy storage capacitor or a rechargeable battery. Once the SMPS works and generates the radiated EMI, each antenna 21 catches the radiated EMI whose frequency band corresponds thereto from space, and, then, the caught, radiated EMI is rectified by the rectifier 23 and transformed to energy to store in the energy storage capacitor or the rechargeable battery. Because the energy of the radiated EMI in unit of space is absorbed by the nearer antenna and results in a reduced amount of the energy of the radiated EMI, the design of circuits for suppressing the radiated EMI may be greatly simplified and therefore reduce cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

We claim:

1. A switched-mode power supply (SMPS) catching radiated electromagnetic interference (EMI) and using its energy, comprising:
   a specific component which generates radiated EMI;
   an antenna disposed on or embedded in the specific component, wherein the frequency range of the antenna corresponds to a frequency band of the radiated EMI generated by the specific component;
   a rectifier electrically connected with a terminal of the antenna;
   an energy storage capacitor electrically connected with the rectifier;
   a power converter; and
   a control chip for the power converter, with a power supply terminal of the control chip electrically connected with a first terminal of the energy storage capacitor, with a second terminal of the energy storage capacitor electrically connected to ground, with the first terminal and the second terminal of the energy storage capacitor electrically connected with an auxiliary power supply circuit, with the rectifier electrically connected with an anode terminal of a first diode, with a cathode terminal of the first diode electrically connected with the first terminal of the energy storage capacitor, wherein the auxiliary power supply circuit comprises an auxiliary winding and a second diode, with the auxiliary winding disposed on a primary side of a transformer, with a first terminal of the auxiliary winding electrically connected with an anode of the second diode, with a cathode terminal of the second diode electrically connected with the first terminal of the energy storage capacitor, and with a second terminal of the auxiliary winding electrically connected to the ground.

2. The SMPS as claimed in claim 1, wherein the specific component comprises a transformer, a power switch component, or a heat sink.

3. The SMPS as claimed in claim 2, wherein the power switch component comprises a diode, a transistor, or a thyristor.

4. The SMPS as claimed in claim 1, wherein the antenna comprises a miniaturized planar antenna which is formed in a rampart-line manner.

5. The SMPS as claimed in claim 1, wherein the SMPS is adapted for a liquid-crystal display (LCD) monitor or an LCD television (TV).

6. The SMPS as claimed in claim 5, wherein the antenna is disposed on or embedded in a plastic cover of the LCD monitor or the LCD TV.

\* \* \* \* \*